(12) United States Patent
Brok

(10) Patent No.: US 11,738,661 B2
(45) Date of Patent: Aug. 29, 2023

(54) METHOD FOR DETERMINING POTENTIAL DAMAGE TO A VEHICLE BATTERY AND MOTOR VEHICLE HAVING A VEHICLE BATTERY

(71) Applicant: AUDI AG, Ingolstadt (DE)

(72) Inventor: Tobias Brok, Kösching (DE)

(73) Assignee: AUDI AG, Ingolstadt (DE)

( * ) Notice: Subject to any disclaimer, the term of this patent is extended or adjusted under 35 U.S.C. 154(b) by 521 days.

(21) Appl. No.: 16/988,975

(22) Filed: Aug. 10, 2020

(65) Prior Publication Data
US 2021/0061126 A1 Mar. 4, 2021

(30) Foreign Application Priority Data
Aug. 29, 2019 (DE) .................. 10 2019 213 054.2

(51) Int. Cl.
*B60L 58/10* (2019.01)
*G01P 15/00* (2006.01)
*G01S 13/58* (2006.01)
*G01S 17/89* (2020.01)
*G01S 13/89* (2006.01)
*G01S 15/89* (2006.01)
*G01S 17/58* (2006.01)
(Continued)

(52) U.S. Cl.
CPC .............. *B60L 58/10* (2019.02); *G01P 15/00* (2013.01); *G01S 13/58* (2013.01); *G01S 13/89* (2013.01); *G01S 15/58* (2013.01); *G01S 15/89* (2013.01); *G01S 17/58* (2013.01); *G01S 17/89* (2013.01)

(58) Field of Classification Search
CPC ......... B60R 16/02; B60R 16/033; G07C 5/08; G01S 13/58; B60L 58/10
See application file for complete search history.

(56) References Cited

U.S. PATENT DOCUMENTS

2013/0166149 A1* 6/2013 Liu ...................... B60G 17/015
701/37
2014/0195114 A1* 7/2014 Tseng ................. B60G 17/0165
701/1
(Continued)

FOREIGN PATENT DOCUMENTS

DE 10 2004 020 927 A1 11/2005
DE 10 2011 113 798 A1 5/2012
(Continued)

OTHER PUBLICATIONS

Examination Report dated Jun. 9, 2020 in corresponding German application No. 10 2019 213 054.2; 14 pages including Machine-generated English-language translation.

*Primary Examiner* — Tan Q Nguyen
(74) *Attorney, Agent, or Firm* — Maier & Maier, PLLC

(57) ABSTRACT

A method for determining potential damage to a vehicle battery. In the method, at least one acceleration data set relating to a vertical acceleration of a motor vehicle, which includes the vehicle battery, is determined. The at least one acceleration data set is then checked for the presence of a predetermined damage criterion, which indicates the potential damage to the vehicle battery. Finally, only for the case that the damage criterion is determined in the at least one acceleration data set, a control signal for actuating an actuator device of the motor vehicle is generated.

13 Claims, 2 Drawing Sheets

(51) Int. Cl.
    *G01S 15/58*    (2006.01)
    *G07C 5/08*     (2006.01)

(56) References Cited

U.S. PATENT DOCUMENTS

| | | | | |
|---|---|---|---|---|
| 2015/0348058 A1* | 12/2015 | Liu | ................... | G06Q 30/0201 |
| | | | | 701/31.5 |
| 2019/0077272 A1* | 3/2019 | Newman | ............... | H02J 7/0013 |
| 2022/0134831 A1* | 5/2022 | Akai | ................. | B60G 17/0165 |
| | | | | 701/37 |

FOREIGN PATENT DOCUMENTS

| | | |
|---|---|---|
| DE | 10 2011 010 230 A1 | 8/2012 |
| DE | 10 2012 021 016 A1 | 4/2013 |
| DE | 10 2012 013 497 A1 | 1/2014 |
| DE | 10 2013 001 325 A1 | 7/2014 |
| DE | 10 2013 204 519 A1 | 9/2014 |
| DE | 10 2013 220 699 A1 | 4/2015 |
| DE | 10 2014 206 538 A1 | 10/2015 |
| DE | 10 2015 215 284 A1 | 2/2017 |
| DE | 10 2015 011 313 A1 | 3/2017 |

* cited by examiner

METHOD FOR DETERMINING POTENTIAL DAMAGE TO A VEHICLE BATTERY AND MOTOR VEHICLE HAVING A VEHICLE BATTERY

FIELD

The disclosure relates to a method for determining a potential damage to a vehicle battery. It is particularly important to be able to detect damage to the vehicle battery as early as possible, which can result in damage, defect, or failure of the vehicle battery with a time delay. The disclosure also relates to a motor vehicle having a corresponding vehicle battery. In the following application, the term "battery" is used as a synonym for an electrical energy accumulator, i.e., for example, also a rechargeable battery.

BACKGROUND

In this context, damage or impairment means an irregular state of the vehicle battery (battery), which does not yet result in inoperability or a defect of the battery, however. With such damage, the battery is thus still completely functional. Due to the damage, however, a defect or damage or failure, for example, of the battery can occur with a time delay if the damage is not recognized and remedied. Long-term consequences can thus occur due to such damage, upon which a defect or malfunction of the battery can occur. Such damage is usually not detectable or recognizable by self-diagnosis of the battery, for example by battery-internal sensors.

Damage can in particular be a deformation or a crack (micro-crack, hairline crack) in the housing of the battery. This can arise, for example, due to an accident of the motor vehicle or due to driving over an obstacle, such as a curb, at high velocity (for example, higher than 50 km/h). This can lead to leakage of the electrolyte, i.e., the battery acid. The electrolyte is a corrosive liquid that can, for example, etch through the electronic system of the vehicle if it escapes and can thus cause damage to vehicle components. In addition, there can also be a short circuit in the electrodes of the battery, whereby the battery and in particular the motor vehicle can catch on fire in the worst case. Such battery fires are generally nearly inextinguishable. In addition, a highly corrosive hydrofluoric acid can form during a battery fire, which can damage the vehicle or injure vehicle occupants or helpers. Therefore, in general a total loss of the vehicle and endangerment of occupants and helpers occurs in the event of an undetected or unrecognized damage to the vehicle battery.

In order to avoid the effects of such battery damage, methods are known, for example, from DE 10 2011 113 798 A1, DE 10 2014 206 538 A1, and DE 10 2015 215 284 A1 for monitoring the functionality of a battery and bringing about a safe state of the battery in an emergency. For example, battery-internal sensors, such as temperature sensors, current sensors, and voltage sensors, or battery-external sensors, for example, a camera, can be used to monitor the functionality. If one of the sensors detects that the battery has a fault, such as an increased current flow or an elevated temperature, or an accident is imminent, for example, the battery is switched off as a precaution.

However, this has the disadvantage that the battery is only switched off or disconnected when the battery already has damage, or when damage to the battery is unavoidable, for example, in the event of an accident.

A method is known from DE 10 2013 204 519 A1 in which a safe state of the battery is brought about upon the occurrence of an irregular vehicle state, such as an accident. For this purpose, battery-internal or battery-external sensors, such as a crash sensor system, an airbag sensor, or a distance radar or an acceleration sensor of an electronic stability program of the vehicle, can be used in order to be able to infer the vehicle state. To determine whether an irregular vehicle state is present, a linear acceleration or rotational acceleration of the vehicle or a vehicle component is preferably checked. In addition, the safe state of the battery can also be produced if it is determined that the battery is subjected to strong accelerations, for example, such as in a rear-end collision and/or when driving over an obstacle at high speed.

Passive protective measures, for example, an aramid underride guard or underbody guard, are also known from the internal prior art, using which the vehicle battery is to be protected, for example, against shock or impact damage when driving over an object or an obstacle.

SUMMARY

An object of the disclosure is to reliably determine potential damage to a vehicle battery.

The disclosure is based on the finding that potential or future damage to a vehicle battery can be detected more reliably if, instead of horizontal acceleration, such as in rear-end collisions, a vertical acceleration of the vehicle or the vehicle battery is determined. "Vertical acceleration" here means acceleration perpendicular with respect to a direction of travel, that is, preferably in the z direction. The determination or measurement of the vertical acceleration can preferably be determined directly or indirectly directly by means of a vertical acceleration sensor or, for example, indirectly, for example, by means of a wheel speed sensor via a change of a wheel speed or by means of a spring travel sensor via a spring travel of a shock absorber of the motor vehicle. The goal of the invention is therefore to be able to detect or determine driving over an obstacle, which is likely or potentially harmful to a vehicle battery, by the motor vehicle.

The disclosure accordingly relates to a method for determining potential damage to a vehicle battery, which comprises the following steps. In a first step, at least one acceleration data set relating to a vertical acceleration of a motor vehicle is determined or provided. This means that one acceleration data set or multiple acceleration data sets can be determined. The respective acceleration data set preferably comprises one or more entries or data values which are associated with or correlate to the vertical acceleration of the motor vehicle or a component of the motor vehicle. This means that the entries can describe the vertical acceleration directly or indirectly. To directly determine the at least one acceleration data set, the motor vehicle can have, for example, an acceleration sensor which is designed to detect the acceleration of the motor vehicle in the vertical direction (perpendicular to the direction of travel). For this purpose, the vertical acceleration sensor can be arranged, for example, near the axle or on the underbody of the vehicle. Alternatively, the acceleration data set can also produced indirectly, for example, by means of a wheel speed sensor or a spring travel sensor (compression travel sensor) of the motor vehicle. This indirect determination or ascertainment of the acceleration data set will also be discussed again in greater detail later in the embodiments of the invention.

In a second step, the at least one acceleration data set is then checked for the presence of a predetermined damage criterion. The damage criterion indicates the potential damage to the vehicle battery. If the damage criterion is present, it can therefore be assumed that, for example, driving over an obstacle has resulted in damage to the vehicle battery, in particular with a high degree of probability. The check can be carried out, for example, by comparing the entries of the acceleration data set to at least one predetermined limiting value. If a value of an entry exceeds this limiting value, for example, the presence of the damage criterion can be confirmed.

Finally, in a third step, a control signal for activating an actuator device of the motor vehicle is only generated for the case in which the damage criterion has been determined or is determined in the at least one acceleration data set. The actuator device can be, for example, a display or a screen for outputting a warning message to an operator or a user or an occupant of the motor vehicle. Alternatively, the actuator device can also be designed as a braking system of the vehicle. Emergency braking of the vehicle can thus be triggered, for example. Furthermore, the actuator device can also be designed as activation electronics for a contactor for the vehicle electrical system (onboard electrical system) for disconnecting the battery from the vehicle electrical system.

By determining the vertical acceleration of the vehicle or at least one vehicle component to check whether driving over an obstacle which is potentially damaging to the battery has occurred, damage or potential damage to the battery can be determined particularly reliably. As a result, a warning message can also be output early to the occupants of the motor vehicle, so that they can find a service station early, for example, to have the damage repaired before the battery is damaged. For example, vehicle fires can be avoided in this way. The traffic safety of the vehicle can thus be improved and the safety for vehicle occupants can be increased. In addition, costly protective measures, such as the aramid underrun protection mentioned above, can be reduced or even completely eliminated.

The disclosure also includes exemplary embodiments which result in additional advantages.

One embodiment provides that the at least one acceleration data set is determined as a function of a spring travel. This is therefore one of the above-mentioned options for indirectly determining the acceleration data set. As mentioned above, this can be carried out, for example, by means of a spring travel sensor or a compression travel sensor. Such spring travel sensors are presently used, for example, in active chassis and are installed, for example, in shock absorbers of motor vehicles. A spring travel sensor can, for example, determine a compression of the shock absorber in the vertical direction. It is assumed that the spring travel changes proportionally with a vertical acceleration of the motor vehicle or a spring of the shock absorber. That is, the higher the vertical acceleration, the greater the spring travel and the the stronger a compression of the spring of the shock absorber, for example. If an object or obstacle is driven over in a harmful manner, the measured spring travel is thus increased in comparison to harmless driving over. To determine the acceleration data set, it is also particularly preferable to compare the spring travels of multiple wheels or the shock absorbers thereof. This is because the spring travel of the wheel of a vehicle which has driven over the obstacle is longer or greater than that of a wheel which has not driven over the obstacle. Thus, the acceleration data set can also include, for example, entries that represent a change in the spring travel of at least one wheel that has passed the obstacle compared to the spring travel of at least one wheel that has not (yet) passed the obstacle.

Additionally or alternatively thereto, it is provided in a further embodiment that the at least one acceleration data set is determined as a function of a change of a wheel speed. This is therefore a further one of the above-mentioned options for indirectly determining the acceleration data set. As mentioned above, this can be done, for example, by means of a wheel speed sensor. Such wheel speed sensors are presently used, for example, in active tire pressure monitoring systems or wheel release detection systems. A wheel speed of a wheel of the motor vehicle can be determined by a wheel speed sensor. With constant driving (moving at an essentially constant velocity or acceleration), a wheel speed which is essentially constant or constantly increasing or decreasing over time results in this case. This change or variation of the wheel speed can be determined, for example, by an evaluation unit of the wheel speed sensor or the motor vehicle. On the other hand, if an obstacle is driven over or passed, a sudden increase or decrease of the wheel speed results, since the distance covered by the wheel suddenly changes due to the obstacle. In the case of a diagram in which the wheel speed is represented over time, it would be recognizable, for example, as a deflection (increase or decrease) of the wheel speed which is a few milliseconds long. The size of the deflection, i.e., also the size of the change of the wheel speed, is dependent here in particular on a velocity of the motor vehicle and a size or height of the obstacle.

In this embodiment, it is assumed that the change of the wheel speed changes proportionally with the vertical acceleration of the motor vehicle or a component of the motor vehicle. That is, the higher the vertical acceleration, the greater the wheel speed change. If an object or obstacle is driven over in a harmful manner, the determined change of the wheel speed thus increases in contrast to harmless driving over.

The change of the wheel speed can particularly preferably also be produced by comparing the wheel speeds of multiple wheels of the motor vehicle to one another. This is because the wheel speed of the wheel of a vehicle which has driven over the obstacle is longer or greater than that of a wheel which has not driven over the obstacle. The acceleration data set can therefore also comprise, for example, entries which represent a change of the wheel speed of at least one wheel which has passed the obstacle in comparison to a wheel speed of at least one wheel which has not (yet) passed the obstacle.

A further embodiment provides that to determine the potential damage to the vehicle battery, in addition to the acceleration data set, at least one environmental data set relating to an environment of the motor vehicle and a velocity of the motor vehicle is determined. This means that one or more environmental data sets can be determined or provided. The at least one environmental data set preferably comprises one or more entries or data values (environmental data) which are associated with or correlate to the environment of the motor vehicle, in particular a formation of an object or obstacle in the environment of the motor vehicle. This means that the entries can represent or describe, for example, a shape and/or size and/or distance to the obstacle. In addition, the at least one environmental data set preferably also comprises one or more entries or data values (velocity data) which are associated with or correlate to the velocity of the motor vehicle (vehicle velocity). In an advantageous manner, the environmental data are recorded in the environmental data set as a function of the velocity data. The motor vehicle can have a velocity sensor for recording the vehicle velocity. The motor vehicle can comprise, for example, a sensor device designed in a suitable manner, such as a camera or a radar sensor, for recording the environment or the environmental data. The different types of determination or ascertainment of the environmental data set using various sensors will be discussed again in greater detail in the embodiments of the invention following later.

Similarly to the acceleration data set, it is provided in this embodiment that the at least one environmental data set is also checked for a presence of a predetermined damage criterion, which indicates the potential damage to the vehicle battery. If the damage criterion is present, it can therefore be assumed that, for example, driving over an obstacle has resulted in damage to the vehicle battery, in particular with a high degree of probability. The check can be carried out, for example, by comparing the entries of the environmental data set to at least one predetermined limiting value. If a value of an entry exceeds this limiting value, for example, the presence of the damage criterion can be confirmed. For example, if it is therefore established that a predetermined velocity is exceeded as a first limiting value in combination with exceeding a predetermined size of the obstacle as a second limiting value, the damage criterion can be confirmed in the environmental data set.

Finally, the above-mentioned control signal for activating the actuator device of the motor vehicle is only generated if the respective damage criterion has been or is determined in the at least one acceleration data set and the at least one environmental data set. Thus, for example, the signals or recorded data from multiple sensors of the motor vehicle are combined to be able to infer damage to the battery upon driving over an obstacle even more reliably. The robustness of the method can thus be improved by combining the information from the various sensors. This can also increase customer acceptance, for example, because it can prevent incorrect and therefore unnecessary warnings to the occupants.

In this context, it is provided in a further embodiment that the at least one environmental data set is determined optically and as a function of the velocity of the motor vehicle. This means that the entries relating to the environmental data can be determined, for example, as a function of an evaluation of vehicle-internal image data. "Vehicle-internal" means here that the image data can be recorded, for example, by a camera of the vehicle, for example, a reversing camera or a front camera. Using suitable image recognition software, the image data can be evaluated and the mentioned formation of the obstacle (size, shape, distance) can thus be inferred. Alternatively, the optical recording of the environmental data of the at least one environmental data set can also be carried out as a function of vehicle-internal lidar data. The lidar data can, for example, be recorded and evaluated by means of a lidar sensor system of the motor vehicle in order to be able to determine, for example, a size, a height, and a shape of the obstacle.

Additionally or alternatively thereto, according to a further embodiment, the at least one environmental data set can be determined electromagnetically and as a function of the velocity of the motor vehicle. In this case, in particular vehicle-internal radar data can be used in the electromagnetic determination of the environmental data set, in particular its environmental data. The radar data can thus be recorded and evaluated, for example, by a radar sensor system of the motor vehicle, as is known, for example, from a parking aid, to be able to infer the formation of the obstacle.

Additionally or alternatively thereto, it is provided in a further embodiment that the at least one environmental data set is determined acoustically and as a function of the velocity of the motor vehicle. The acoustic determination of the at least one environmental data set, in particular its environmental data, can preferably take place as a function of vehicle-internal ultrasound data. "Vehicle-internal" preferably means that the ultrasound data are determined and evaluated by an ultrasound sensor system of the motor vehicle, as is known, for example, from a parking aid, to be able to infer the formation of the obstacle.

In the three above-mentioned embodiments, for example, firstly an approaching obstacle can be recognized using corresponding sensors (camera, radar sensor, ultrasound sensor, lidar sensor) attached to the front of the motor vehicle in the direction of travel. Depending on the velocity, it can additionally be recognized that the vehicle is not being stopped or decelerated. Subsequently, the obstacle moving away, corresponding to the vehicle velocity, can be recognized by sensors attached to the rear of the motor vehicle in the direction of travel (corresponding to the sensors attached to the front) and thus it can be inferred that the obstacle was driven over.

A further embodiment provides that to determine the presence of the damage criterion, it is checked whether at least one entry of the at least one acceleration data set with the at least one environmental data set reaches at least one predetermined limiting value. This means that the entries of the at least one acceleration data set or the at least one environmental data set can be evaluated to recognize that the at least one predetermined limiting value has been reached. If the at least one limiting value is reached by at least one of the entries, the presence of the damage criterion is confirmed in this case. The predetermined limiting value can be stored, for example, in a limiting value data set in a storage device of the vehicle. The limiting values for a vertical acceleration or, for example, a wheel speed change can be stored in this limiting value data set, for example. Similarly, the limiting value data set can also comprise corresponding limiting values for the other above-mentioned options for recording the acceleration data set and/or the environmental data set. The limiting value data set can be designed, for example, as a lookup table.

To be able to specify the at least one limiting value, it is provided in a further embodiment that the at least one limiting value is determined by means of machine learning. This means that the limiting value or the limiting value data set can be generated by training the vehicle to differentiate between normal, harmless driving over in comparison to harmful driving over of an obstacle. For this purpose, the motor vehicle, in particular a control device of the motor vehicle can comprise a neural network which is formed having a suitable training algorithm for determining harmful driving over. Alternatively or additionally, laboratory tests or driving tests can be used to determine the respective limiting value. The vehicle can thus be trained or programmed accordingly to recognize harmful driving over of an obstacle. The occupants are therefore preferably only warned about damage to the battery if the vehicle has recognized damage to the battery with a certain probability.

The invention also relates to a motor vehicle having a vehicle battery. The motor vehicle comprises at least one sensor device, which is designed to determine or provide an acceleration data set relating to the vertical acceleration of the motor vehicle, to recognize the damage to the vehicle battery. Furthermore, the motor vehicle also includes an evaluation device which is designed to check the at least one acceleration data set for the presence of the predetermined damage criterion, which indicates potential damage to the vehicle battery. Finally, the motor vehicle also comprises a control device which is designed to generate the control signal for actuating the actuator device of the motor vehicle only for the case in which the damage criterion is determined in the at least one acceleration data set. The evaluation device can preferably be formed jointly with the control device in a processing unit, for example, in a CPU (central processing unit) or a microcontroller. The motor vehicle according to the invention is preferably designed as an automobile, in particular as a passenger car or truck, or as a passenger bus or motorcycle. The motor vehicle is particularly preferably an electrically drivable motor vehicle, such as an electric vehicle or a hybrid vehicle.

The invention also includes refinements of the motor vehicle according to the invention which have features as have already been described in conjunction with the refinements of the method according to the invention. For this reason, the corresponding refinements of the motor vehicle according to the invention are not described once again here.

The invention also comprises the combinations of the features of the described embodiments.

BRIEF DESCRIPTION OF THE DRAWINGS

Exemplary embodiments of the invention are described hereinafter. In the figures.

DETAILED DESCRIPTION

Figure 1:
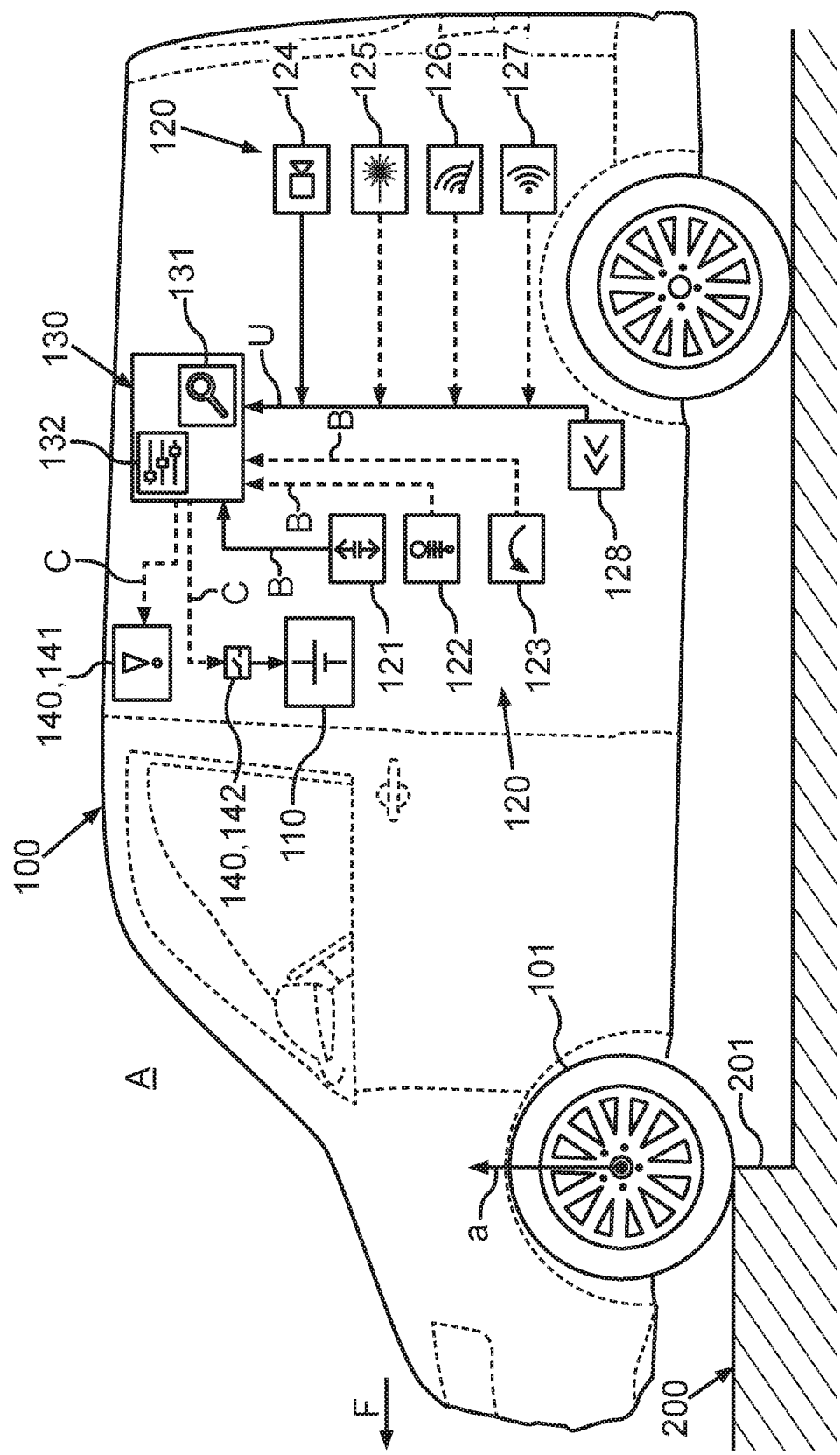
FIG. 1 shows a schematic illustration of a motor vehicle which is designed to determine damage to the vehicle battery due to harmful driving over of an obstacle

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is intended to include combinations of the features of the embodiments other than those shown. Furthermore, the described embodiments can also be supplemented by further features of the invention that have already been described.

In the figures, the same reference numerals designate elements that have the same function.

If a motor vehicle drives over an object or an obstacle, in particular at high velocities, it can damage or impair a vehicle battery or battery. In particular in the event of a collision of the obstacle with an underbody of the motor vehicle, compression of the battery and thus deformation of the battery or at least one battery cell or fine microcracks or hairline cracks can occur in a housing of the battery. However, such damage frequently does not yet result in a malfunction or a defect of the vehicle battery, so that it can initially be used further without restrictions in its function. As a rule, such damage thus cannot be established by a battery monitoring system, for example, by means of current sensors, voltage sensors, or temperature sensors of the vehicle battery. However, for example, stronger deformation or an enlargement of a crack in the housing can occur due to typical shocks while driving, whereby damage or a defect of the vehicle battery occurs. Time-delayed damage or later consequences can thus occur on the vehicle battery due to damage to the vehicle battery. For example, contact with the electrodes and therefore a short-circuit in the vehicle battery can occur due to a stronger deformation of the vehicle battery. The vehicle battery can ignite in this case, whereby occupants can be endangered. Moreover, for example, the strongly corrosive electrolyte of the vehicle battery, i.e., the battery acid, can escape, whereby corrosion and thus destruction of the vehicle electrical system can occur.

To be able to already recognize potential or future damage to a vehicle battery due to driving over an obstacle reliably or early, a vertical acceleration of a motor vehicle or at least one vehicle component can be monitored. Vertical means an acceleration perpendicular to a direction of travel of the motor vehicle or a two-dimensional plane of the ground or a roadway.

In this context, FIG. 1 shows an exemplary design of a corresponding motor vehicle 100. The motor vehicle 100 moves in a direction of travel F on a roadway 200. The roadway 200 has an obstacle 201 in the form of an edge, such as a curb edge. In order to maintain the direction of travel F, the motor vehicle 100 has to overcome the obstacle 201, i.e., the edge in the roadway 200. In particular if the motor vehicle 100 drives over the obstacle 201 at a high velocity, for example, at greater than 50 km/h, a high acceleration a in the vertical direction with respect to the direction of travel F acts on the motor vehicle 100, in particular a component of the motor vehicle 100, such as a front wheel 101.

To be able to determine damage to the vehicle battery 110 resulting due to rapidly driving over the obstacle, the motor vehicle 100 comprises at least one sensor device 120, as shown by way of example in FIG. 1. In the exemplary embodiment in FIG. 1, eight such sensor devices 120 each having different functions are provided. However, more than eight or fewer than eight sensor devices 120 can also be provided. Each of the sensor devices 120 is designed to determine at least one acceleration data set B relating to the vertical acceleration a of the motor vehicle 100. Preferably, at least one environmental data set U relating to an environment A of the motor vehicle 100 and a velocity of the motor vehicle 100 can also be determined by means of the at least one sensor device 120. The respective acceleration data set B can then preferably be provided or transferred jointly with the respective environmental data set U to a processing unit 130 of the motor vehicle 100. The processing unit 130 comprises, as shown in FIG. 1, for example, an evaluation device 131 and a control device 132. The processing unit 130 can preferably be designed as a microcontroller or CPU.

The evaluation device 131 is designed to check the at least one acceleration data set and the at least one environmental data set for the presence of a respective predetermined damage criterion, which indicates the potential damage to the vehicle battery 110. To be able to determine the respective damage criterion in the at least one acceleration data set B and the at least one environmental data set U, the evaluation device 131 can be designed, for example, to evaluate the data or entries of the at least one acceleration data set B or the at least one environmental data set U to recognize reaching at least one predetermined limiting value. This limiting value can represent a value of the vertical acceleration or an environmental parameter, for example, a size or height of the obstacle, in the case of which harmful driving over of the obstacle has certainly taken place. Thus, if the at least one limiting value is reached, the presence of the damage criterion in the at least one acceleration data set B and the at least one environmental data set U can be confirmed. The respective limit value can be determined in particular by means of machine learning. The motor vehicle can thus be trained, for example, to differentiate normal and harmless driving over from driving over the obstacle 201 during which damage occurs to the vehicle battery 110.

Finally, the control device 132 of the processing unit 130 is designed to generate a control signal C to activate an actuator device 140 of the motor vehicle 100 only for the case in which the evaluation device 131 determines or confirms the respective damage criterion in the at least one acceleration data set and the at least one environmental data set U.

As shown in FIG. 1, the actuator device 140 can be designed, for example, as a display or screen 141. A warning message can be output to a user or occupant of the motor vehicle 100 via this display screen 141 by the control signal C. The user can be informed by this warning message that damage to the vehicle battery 110 has very probably occurred due to driving over the obstacle and the user can be encouraged to visit a service station to repair the vehicle battery 110. Alternatively, the actuator device 140 can also be designed as a contactor 124 of the vehicle 110. In this case, the contactor 142 can be activated to galvanically or electrically disconnect the vehicle battery 110 from the rest of the vehicle electrical system. Thus, harmful driving over an obstacle, i.e., driving over an obstacle which results in damage to the vehicle battery 110, can be determined particularly reliably by using both at least one acceleration data set B in combination with at least one environmental data set U.

The respective designs and functions of the plurality of sensor devices 120 of the motor vehicle 100 according to FIG. 1 are described in greater detail hereinafter. In order to be able to determine the at least one acceleration data set B, the motor vehicle 100 comprises, for example, at least one vertical acceleration sensor 121. The vertical acceleration sensor 121 is designed to record a vertical acceleration a of the motor vehicle 100 or a motor vehicle component, for example the front wheel 101, over time and to generate the acceleration data set B from it, for example. The acceleration data set B comprises, for example, one or more entries relating to the vertical acceleration a of the motor vehicle 100 or at least one motor vehicle component as a function of time. The vertical acceleration sensor 121 can then provide the change over time of the vertical acceleration a during travel to the processing unit 130 as the acceleration data set B for evaluation.

To determine an additional or alternative acceleration data set B, the motor vehicle 100 can also comprise, for example, at least one spring travel sensor 122 as the sensor device 120. The spring travel sensor 122 is designed to record a spring travel or compression travel of an active chassis, such as at least one shock absorber of the motor vehicle 100, over time. The spring travel changes in particular directly proportionally to the vertical acceleration a, so that the vertical acceleration a can be inferred via the measured spring travel. The spring travel sensor 122 can then provide the change over time of the spring travel during travel to the processing unit 130 as the alternative or additional acceleration data set B for evaluation.

Alternatively or additionally, the motor vehicle 100 can furthermore comprise at least one wheel speed sensor 123 as the sensor device 120. The wheel speed sensor 123 is designed to record a wheel speed of at least one of the wheels of the motor vehicle 100 over time and to determine a time-dependent change of the wheel speed therefrom. The respective change in the wheel speed as a function of time can thus be used as the respective entry of an acceleration data set B. The wheel speed sensor 123 could thus additionally or alternatively provide a further acceleration data set B to the processing unit 130 for evaluation.

Therefore, for example, an acceleration data set B, which was determined by means of the vertical acceleration sensor 121 or the spring travel sensor 122 or the wheel speed sensor 123 or a combination of these three sensor devices 120 can be provided to the processing unit 130. Alternatively, multiple, for example, two or three acceleration data sets B, which were each determined by means of the vertical acceleration sensor 121 with the spring travel sensor 122 or the wheel speed sensor 123, can also be provided to the processing unit 130.

To determine the environmental data set U, the motor vehicle 100 can comprise a velocity sensor 128 and at least one environmental sensor, for example, a camera 124, a lidar sensor 125, a radar sensor 126, and/or an ultrasound sensor 127. The at least one environmental data set U can thus have at least one entry relating to a velocity of the motor vehicle 100 and at least one entry corresponding thereto relating to an environment A, in particular a formation of an object or obstacle 201 in the environment A. A shape and/or size and/or distance to the obstacle 201 can be described, for example, by the mentioned formation. In other words, the environmental data set U can comprise environmental data as a function of velocity data as entries. The camera 124, the lidar sensor 125, the radar sensor 126, and the ultrasound sensor 127 can particularly preferably be, for example, components of a parking aid system of the motor vehicle 100.

An environmental data set can thus be recorded, for example, optically by means of the camera 124 or the lidar sensor 125 and as a function of the vehicle velocity. The camera 124 can generate image data from the recorded environment A and evaluate these data to be able to recognize the formation of the obstacle 201. Correspondingly, the lidar sensor 125 can record the environment A by means of laser light, generate a lidar image of the environment A therefrom, and evaluate it to be able to recognize the formation of the obstacle 201.

Alternatively or additionally thereto, a further environmental data set A can be recorded electromagnetically by means of the radar sensor 126 and as a function of the vehicle velocity. The radar sensor 126 can record the environment A by means of electromagnetic radiation, generate a radar image of the environment A therefrom, and evaluate it to be able to recognize the formation of the obstacle 201.

Alternatively or additionally thereto, a further environmental data set U can be recorded acoustically by means of the ultrasound sensor 127 and as a function of the vehicle velocity. The ultrasound sensor 127 can record the environment A by means of ultrasound waves, generate an ultrasound image of the environment A therefrom, and evaluate it to be able to recognize the formation of the obstacle 201.

The motor vehicle 100 can preferably also comprise a plurality of the four above-mentioned environmental sensors. For example, in each case one which records an environment in the direction of travel F in front of the motor vehicle 100 and one which records the environment in the direction of travel F behind the motor vehicle 100. An approaching obstacle 201 can be recognized, for example, by the respective front sensor device 120. As a function of the vehicle velocity, i.e., for example, if the vehicle is subsequently not stopped, an obstacle 201 moving away in accordance with the vehicle velocity can thereupon be recognized by the rear sensor device 120. It can therefore be presumed that the obstacle 201 was driven over.

Figure 2:
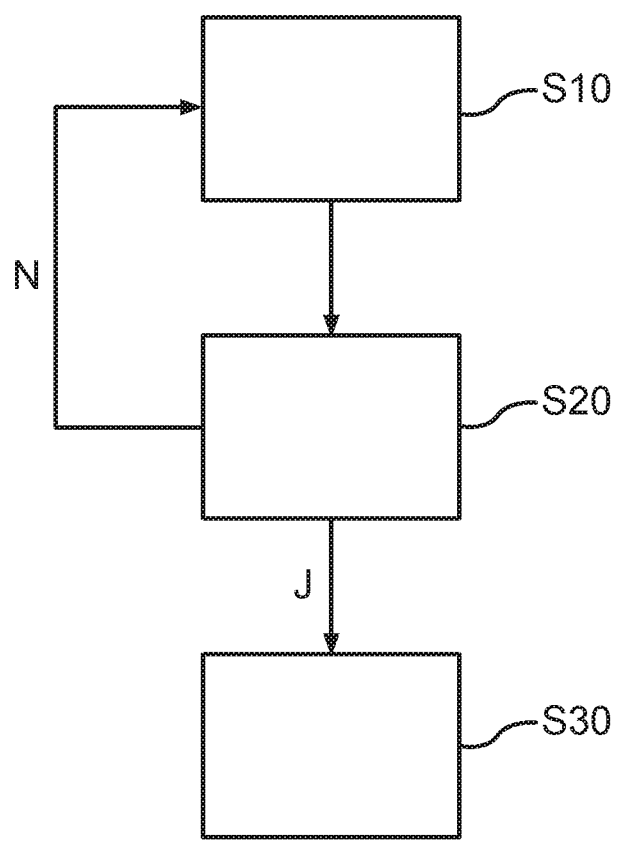
FIG. 2 shows a schematic flow chart of a method for determining damage to the vehicle battery due to harmful driving over of an obstacle.

FIG. 2 summarizes once again individual method steps as can be carried out to determine potential damage to the vehicle battery 110. In a step S10, the at least one acceleration data set B relating to the vertical acceleration A of the motor vehicle 100 can first be determined. In a step S20, it can then be checked whether the predetermined damage criterion, which indicates the potential damage to the vehicle battery 110, is present in the at least one acceleration data set B. Finally, in a step S30, only for the case that the damage criterion is determined in the at least one acceleration data set B, the control signal C for activating the actuator device 140 of the motor vehicle 100 can be generated. If, on the other hand, the damage criterion is not verified or not determined, steps S10 and S20 can be repeated until, for example, the damage criterion can be verified.

The invention claimed is:

1. A method for determining potential damage to a vehicle battery, comprising the following steps:
   determining at least one acceleration data set relating to a vertical acceleration of a motor vehicle,
   checking the at least one acceleration data set for a presence of a predetermined damage criterion which indicates the potential damage to the vehicle battery, and
   generating a control signal to actuate an actuator device of the motor vehicle when the damage criterion is determined in the at least one acceleration data set,
   wherein the actuator device is a contactor for an electrical system of the motor vehicle, and actuation of the contactor disconnects the vehicle battery from the electrical system.

2. The method as claimed in claim 1, wherein the vertical acceleration of the motor vehicle is determined based on at least a spring travel of a suspension of one or more wheels of the motor vehicle.

3. The method as claimed in claim 1, wherein the vertical acceleration of the motor vehicle is determined based on at least a change in a wheel speed.

4. The method as claimed in claim 1, further comprising:
   determining at least one environmental data set relating to an environment of the motor vehicle and a velocity of the motor vehicle,
   checking the at least one environmental data set for a presence of a predetermined damage criterion, which indicates the potential damage to the vehicle battery, and
   generating the control signal for actuating the actuator device of the motor vehicle when the respective damage criterion is determined in the at least one acceleration data set and the at least one environmental data set.

5. The method as claimed in claim 4, wherein the at least one environmental data set is determined optically and as a function of the velocity of the motor vehicle.

6. The method as claimed in claim 4, wherein the at least one environmental data set is determined electromagnetically and as a function of the velocity of the motor vehicle.

7. The method as claimed in claim 4, wherein the at least one environmental data set is determined acoustically and as a function of the velocity of the motor vehicle.

8. The method as claimed in claim 4, wherein to determine the presence of the damage criterion, at least one entry of the at least one acceleration data set or of the at least one environmental data set is checked against at least one predetermined limiting value, wherein the presence of the damage criterion is confirmed if the at least one limiting value is reached.

9. The method as claimed in claim 8, wherein the at least one limiting value is determined by machine learning.

10. A motor vehicle comprising a vehicle battery, at least one sensor device, an evaluation device, and a control device for carrying out the method according to claim 1.

11. A method for determining potential damage to a vehicle battery, comprising the following steps:
    determining at least one acceleration data set relating to a vertical acceleration of a motor vehicle,
    checking the at least one acceleration data set for a presence of a predetermined damage criterion which indicates the potential damage to the vehicle battery, and
    generating a control signal to actuate an actuator device of the motor vehicle when the damage criterion is determined in the at least one acceleration data set,
    wherein the actuator device is a braking system of the motor vehicle, and actuation of the braking system triggers an emergency braking of the motor vehicle.

12. A method for determining potential damage to a vehicle battery, comprising the following steps:
    determining at least one acceleration data set relating to a vertical acceleration of a motor vehicle,
    checking the at least one acceleration data set for a presence of a predetermined damage criterion which indicates the potential damage to the vehicle battery, and
    generating a control signal to actuate an actuator device of the motor vehicle when the damage criterion is determined in the at least one acceleration data set,
    wherein the actuator device is a display or screen, and actuation of the display or screen outputs a warning message to an operator of the motor vehicle.

13. The method as claimed in claim 12, wherein the warning message advises the operator of the motor vehicle to have the motor vehicle serviced.

\* \* \* \* \*